US012644508B2

(12) United States Patent
Garcia

(10) Patent No.: US 12,644,508 B2
(45) Date of Patent: Jun. 2, 2026

(54) TORQUE CONVERTER INCLUDING HOUSING SHELLS PRESS FIT TOGETHER

(71) Applicant: Schaeffler Technologies AG & Co. KG, Herzogenaurach (DE)

(72) Inventor: Ricardo Humberto Garcia, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/585,601

(22) Filed: Feb. 23, 2024

(65) Prior Publication Data

US 2025/0271051 A1 Aug. 28, 2025

(51) Int. Cl.
  *F16H 41/28* (2006.01)
  *F16H 41/24* (2006.01)
(52) U.S. Cl.
  CPC ....... *F16H 41/28* (2013.01); *F16H 2041/243* (2013.01)
(58) Field of Classification Search
  CPC .. F01D 25/24–285; F16H 41/24; F16H 41/28; F16H 41/243; F16D 2300/26; F16B 4/004; F16F 15/12–1492
  USPC .................. 416/180, 197 C, 213 R; 74/730.1
  See application file for complete search history.

(56) References Cited

U.S. PATENT DOCUMENTS

| | | | | | |
|---|---|---|---|---|---|
| 2,140,106 | A | * | 12/1938 | Cox | F16D 33/20 |
| | | | | | 219/137 R |
| 3,138,107 | A | * | 6/1964 | Zeidler | F16H 41/24 |
| | | | | | 415/215.1 |
| 4,867,641 | A | * | 9/1989 | Okuno | F16H 41/24 |
| | | | | | 219/137 R |
| 7,040,188 | B2 | * | 5/2006 | Ootsuka | F16H 41/24 |
| | | | | | 74/421 R |
| 7,284,645 | B2 | * | 10/2007 | Yamamoto | F16H 45/02 |
| | | | | | 192/112 |
| 7,578,713 | B2 | * | 8/2009 | Miyata | B63H 20/14 |
| | | | | | 440/75 |

(Continued)

FOREIGN PATENT DOCUMENTS

WO    WO 2015079742    *  6/2015   ............. B23K 26/28

OTHER PUBLICATIONS

WO 2015/079742—translation (Year: 2015).*

*Primary Examiner* — Courtney D Heinle
*Assistant Examiner* — Behnoush Haghighian
(74) *Attorney, Agent, or Firm* — Davidson Kappel LLC

(57) ABSTRACT

A torque converter includes a housing; and a turbine, impeller blades and a stator within the housing. The impeller blades are configured for directing fluid to the turbine and, the stator is configured for redirect fluid from the turbine back to the impeller. The housing includes a first shell and a second shell joined together. The first shell or the second shell supports the impeller blades. The first shell includes a first tubular end section and the second shell including a second tubular end section. The first tubular end section is received within the second tubular end section. The first tubular end section includes a base circumferential surface and a protrusion protruding from the base circumferential surface. The protrusion engages a circumferential surface of the second tubular end section to form a press fit connection between the first shell and the second shell.

18 Claims, 5 Drawing Sheets

(56)                      References Cited

U.S. PATENT DOCUMENTS

| | | | | | |
|---|---|---|---|---|---|
| 8,051,964 | B2 * | 11/2011 | Olsen | ...................... | F16H 41/24 |
| | | | | | 192/3.3 |
| 10,036,462 | B2 * | 7/2018 | Wilson | ................... | F16H 48/40 |
| 10,077,826 | B2 * | 9/2018 | Momiyama | ............ | B23K 26/28 |
| 10,487,932 | B2 * | 11/2019 | Wilson | ................... | F16H 48/40 |
| 2006/0000682 | A1 * | 1/2006 | Yamamoto | ............. | F16H 45/02 |
| | | | | | 192/112 |
| 2007/0287338 | A1 * | 12/2007 | Miyata | .................. | B63H 20/14 |
| | | | | | 440/5 |
| 2008/0251345 | A1 * | 10/2008 | Zahner | ................... | F16H 41/28 |
| | | | | | 192/112 |
| 2016/0290461 | A1 * | 10/2016 | Momiyama | ............. | F16H 41/28 |
| 2019/0277381 | A1 * | 9/2019 | Une | ....................... | F16H 41/28 |

* cited by examiner

TORQUE CONVERTER INCLUDING HOUSING SHELLS PRESS FIT TOGETHER

The present disclosure relates generally to torque converter housings.

BACKGROUND

Torque converter housing shells are welded together.

SUMMARY

A torque converter includes a housing; and a turbine, impeller blades and a stator within the housing. The impeller blades are configured for directing fluid to the turbine and, the stator is configured for redirect fluid from the turbine back to the impeller. The housing includes a first shell and a second shell joined together. The first shell or the second shell supports the impeller blades. The first shell includes a first tubular end section and the second shell including a second tubular end section. The first tubular end section is received within the second tubular end section. The first tubular end section includes a base circumferential surface and a protrusion protruding from the base circumferential surface. The protrusion engages a circumferential surface of the second tubular end section to form a press fit connection between the first shell and the second shell.

In examples, the base circumferential surface and the protrusion are on an outer circumference of the first tubular end section and the circumferential surface of the second tubular end section is on an inner circumference of the second tubular end section.

In examples, a rim of the second tubular end section is welded to an outer circumferential surface of the first shell by a weld.

In examples, the protrusion is axially spaced from the weld by the base circumferential surface.

In examples, the protrusion is axially spaced from a rim of first tubular end section by the base circumferential surface.

In examples, the protrusion is a ring extending around a center axis of the torque converter.

In examples, the press fit connection has an axial length of 1.5 to 2.2 mm.

In examples, the base circumferential surface and the circumferential surface of the second tubular end section are radially spaced apart by 0.04 to 0.15 mm.

In examples, the first tubular end section and the second tubular end section axially overlap each other by at least 8 mm.

In examples, the first tubular end section and the second tubular end section axially overlap each other by between 8 mm and 12 mm.

In examples, the protrusion protrudes from the base circumferential surface by between 0.10 and 0.52 mm.

A method of constructing a torque converter is also provided. The torque converter includes a turbine, impeller blades and a stator within a housing, the impeller blades configured for directing fluid to the turbine. The stator is configured for redirect fluid from the turbine back to the impeller. The housing includes a first shell and a second shell joined together. The first shell or the second shell supports the impeller blades. The first shell includes a first tubular end section and the second shell including a second tubular end section. The method includes creating, on the first tubular end section, a base circumferential surface and a protrusion protruding from the base circumferential surface; and joining the first tubular end section to the second tubular end section by pressing the protrusion into engagement with a circumferential surface of the second tubular end section to form a press fit connection between the first shell and the second shell.

In examples, the creating includes machining the first tubular end section to form the base circumferential surface and the protrusion.

In examples, the machining includes machining two rings into the first tubular end section to form the protrusion in between two separate ring-shaped portions of the base circumferential surface.

In examples, prior to the joining, the protrusion and the circumferential surface of the second tubular end section have a radial overlap of 0.06 mm to 0.37 mm.

In examples, the radial overlap is formed by an outer diameter of the protrusion being greater than an inner diameter of the second tubular end section.

In examples, the method further includes, after to the joining, welding a rim of the second tubular end section to an outer circumferential surface of the first shell.

In examples, the joining includes pressing the first tubular end section into the second tubular end section, the protrusion and base circumferential surface being on an outer circumference of the first tubular end section, the circumferential surface of the second tubular end section being on an inner circumference of the second shell.

In examples, the method further includes, prior to the joining, fixing the impeller blades to the second shell.

BRIEF DESCRIPTION OF THE DRAWINGS

The present disclosure is described below by reference to the following drawings, in which.

DETAILED DESCRIPTION

Torque converter assemblies can require specific values of alignment between the impeller assembly and cover assembly to guarantee the best assembly and functionality on the transmission. This requirement can require a designed geometry on the closure welding to allow the assembly and the welding to flow as well as have the less amount material that may contaminate the assembly. The clearance between the two components allows a certain degree of tilting, and this inclination may lead to inadequate contact between internal components, or misalignment between cover and assembly.

Figure 1:
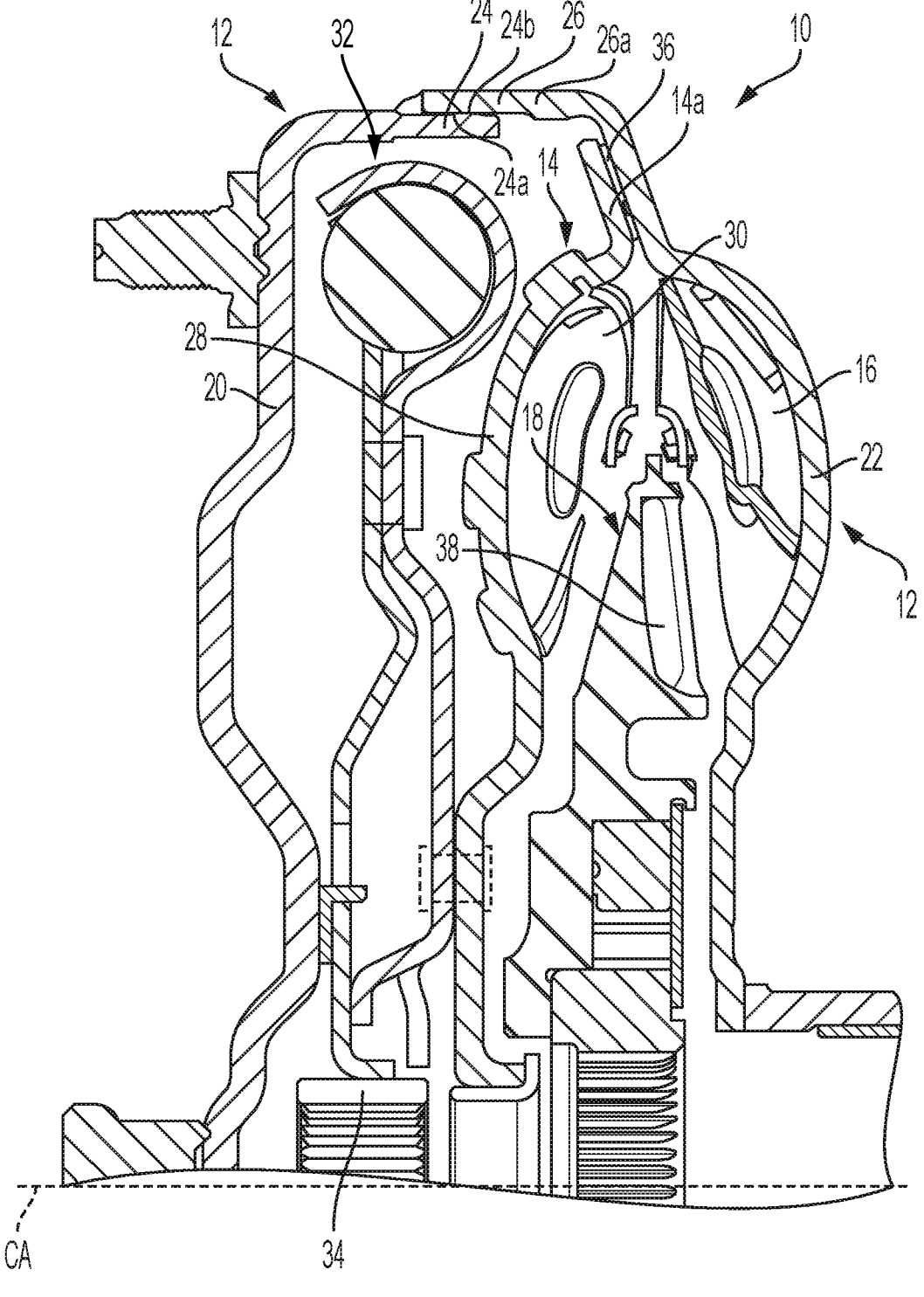
FIG. 1 schematically shows a cross-sectional side view of a torque converter in accordance with an embodiment of the present disclosure.

FIG. 1 shows a cross-sectional side view of a hydrodynamic torque converter 10 in accordance with an embodiment of the present disclosure. Torque converter 10 includes a housing 12, a turbine 14, impeller blades 16 and a stator 18 within the housing 12. In a known manner, the impeller blades 16 are configured for directing fluid to the turbine 14 and the stator 18 is configured for redirect fluid from the turbine 14 back to the impeller blades 16. The housing 12 including a first shell 20 and a second shell 22 joined together. The second shell 22 supports the impeller blades 16. The first shell 20 includes a first tubular end section 24 and the second shell 22 includes a second tubular end section 26. The first tubular end section 24 is received within the second tubular end section 26. The first tubular end section 24 includes a base circumferential surface 24a and a protrusion 24b protruding from the base circumferential surface 24a. The protrusion 24b engages a circumferential surface 26a of the second tubular end section 26 to form a press fit connection between the first shell 20 and the second shell 22.

First shell 20 is configured for connecting to a crankshaft of an internal combustion engine and/or an output of an electric motor. Turbine 14 includes a turbine shell 28 supporting a plurality of turbine blades 30. A damper assembly 32 is positioned between second shell 22 and turbine 14 and is configured for transferring torque from turbine 14 to a transmission input shaft via a hub 34.

As turbine 14 is driven, either through contact via a friction material 36 attached to an outer radial extension 14a of turbine 14 when the lockup clutch is locked, or through fluid flow between blades 16, 30, turbine 14 transfers torque to damper assembly 32, which in turn drives the transmission input shaft.

Torque converter 10 also includes stator 18 axially between turbine blades 30 and impeller blades 16. Stator 18 includes stator blades 38 to redirect fluid flowing from the turbine blades 30 before the fluid reaches impeller blades 16 to increase the efficiency of torque converter 10 as turbine 14, impeller blades 16 and stator 18 rotate about a center axis CA of torque converter 10. Unless otherwise specified, the terms radial, axial and circumferential and derivatives thereof are used herein reference to center axis CA.

Figure 2:
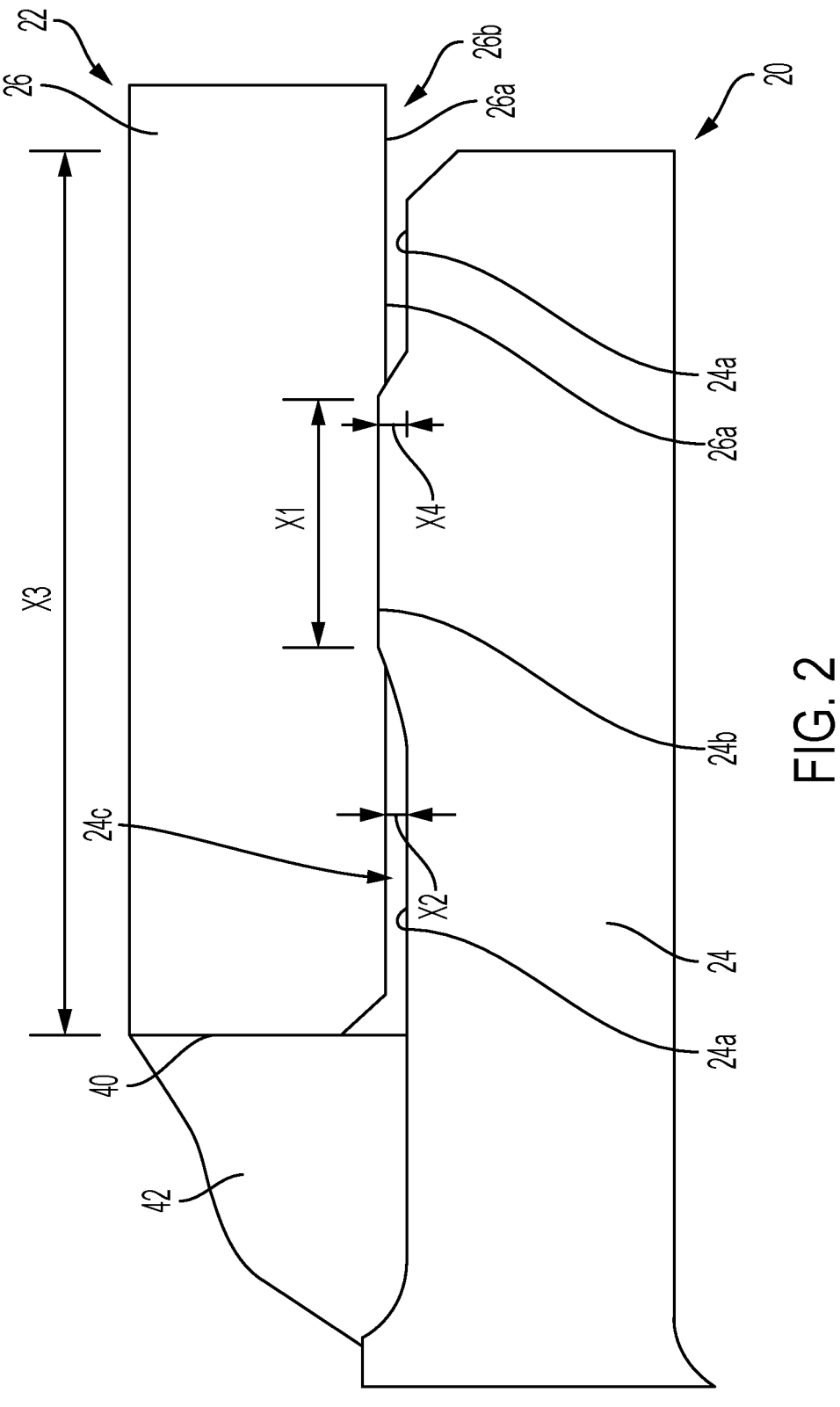
FIG. 2 shows an enlarged view of a portion of FIG. 1, illustrating the connection of the first and second shells of the housing.

FIG. 2 shows an enlarged cross-sectional side view of the connection between the first shell 20 and second shell 22. The base circumferential surface 24a and the protrusion 24b are on an outer circumference 24c of the first tubular end section 24 and the circumferential surface 26a of the second tubular end section 26 is on an inner circumference 26b of the second tubular end section 26.

A rim 40 of the second tubular end section 26 is welded to an outer circumferential surface 24c of the first shell 20 by a weld 42. The protrusion 24b is axially spaced from the weld 42 by at least a portion of the base circumferential surface 24a. The protrusion 24b is axially spaced from rim 40 of first tubular end section 26 by at least the portion of the base circumferential surface 24a.

The protrusion 24b can be a ring extending around center axis CA (FIG. 1) of the torque converter 10. The press fit connection between the protrusion 24b and circumferential surface 26a can have an axial length X1 of 1.5 to 2.2 mm. The base circumferential surface 24a and the circumferential surface 26a of the second tubular end section 26 can be radially spaced apart by 0.04 to 0.15 mm by a radial distance of X2. The first tubular end section 24 and the second tubular end section 26 can axially overlap each other by an axial length X3 by between 8 mm and 12 mm. The protrusion 24b protrudes from the base circumferential surface 24a by a radially distance X4 of between 0.10 and 0.52 mm.

FIGS. 3a to 3e show a method of constructing the torque converter 10.

Figure 3B:
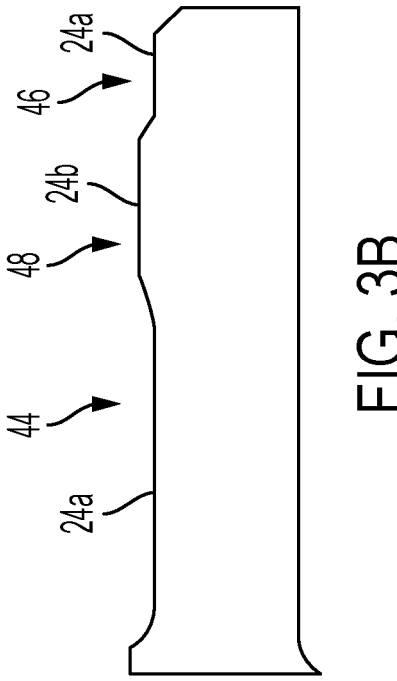
FIGS. 3*a* to 3*e* illustrate steps of a method of forming the torque converter shown in FIG. 1.
Figure 3A:
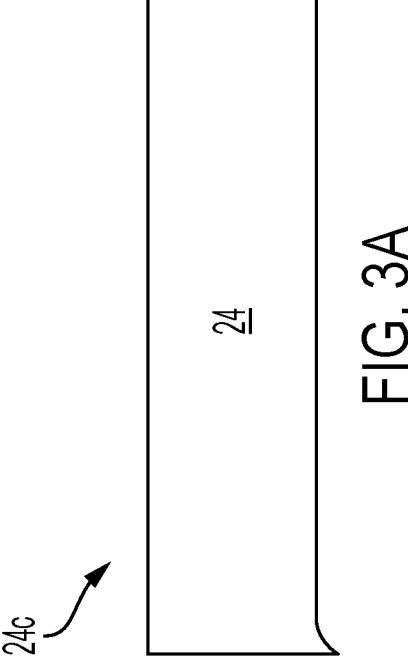

FIG. 3a shows the first tubular end section 24 prior to the forming of protrusion 24b. The outer circumference 24c of the first tubular end section 24 has a cylindrical shape.

Next, as illustrated in FIG. 3b, the method can include creating, on the first tubular end section 24, the base circumferential surface 24a and the protrusion 24b protruding from the base circumferential surface 24a. More specifically, the base circumferential surface 24a and the protrusion 24b are formed by machining the first tubular end section 24 to form the base circumferential surface 24a and the protrusion 24b. The machining can form two ring section surface sections 44, 46 into the first tubular end section 24, with each ring-shaped surface section 44, 46 formed part of base circumferential surface 24a. Such machining can thus also form the protrusion 24b as a ring 48 in between the two separate ring-shaped sections 44, 46 of the base circumferential surface 24a.

Figure 3C:
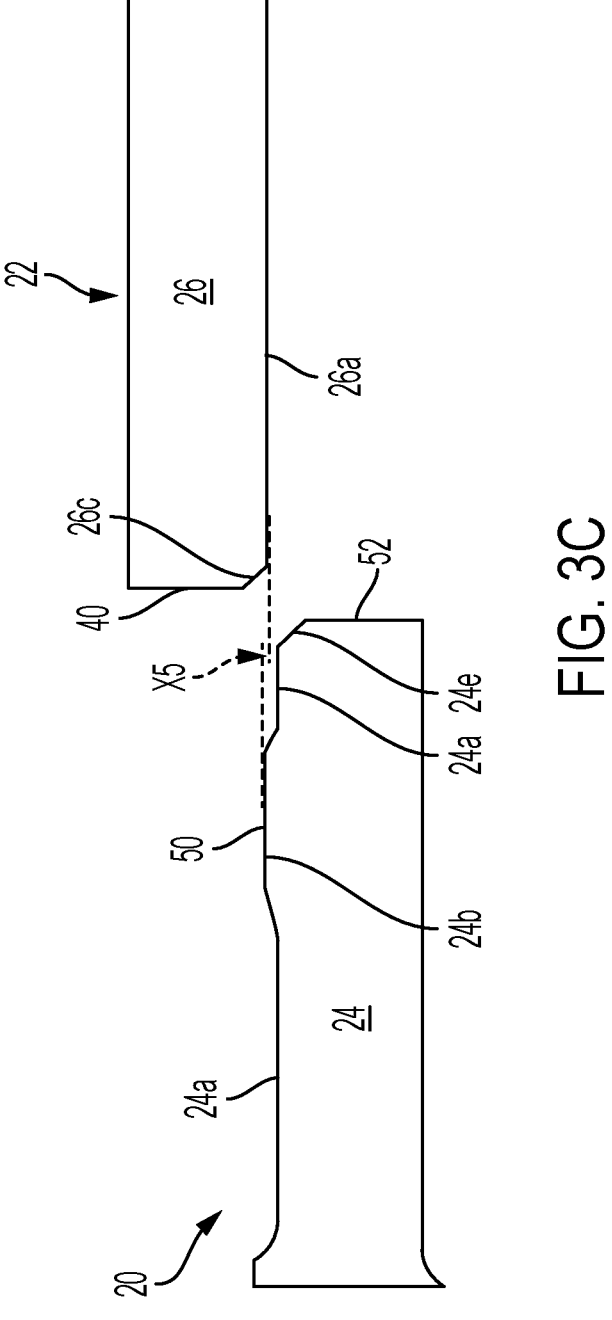
Figures 3D, 3E:
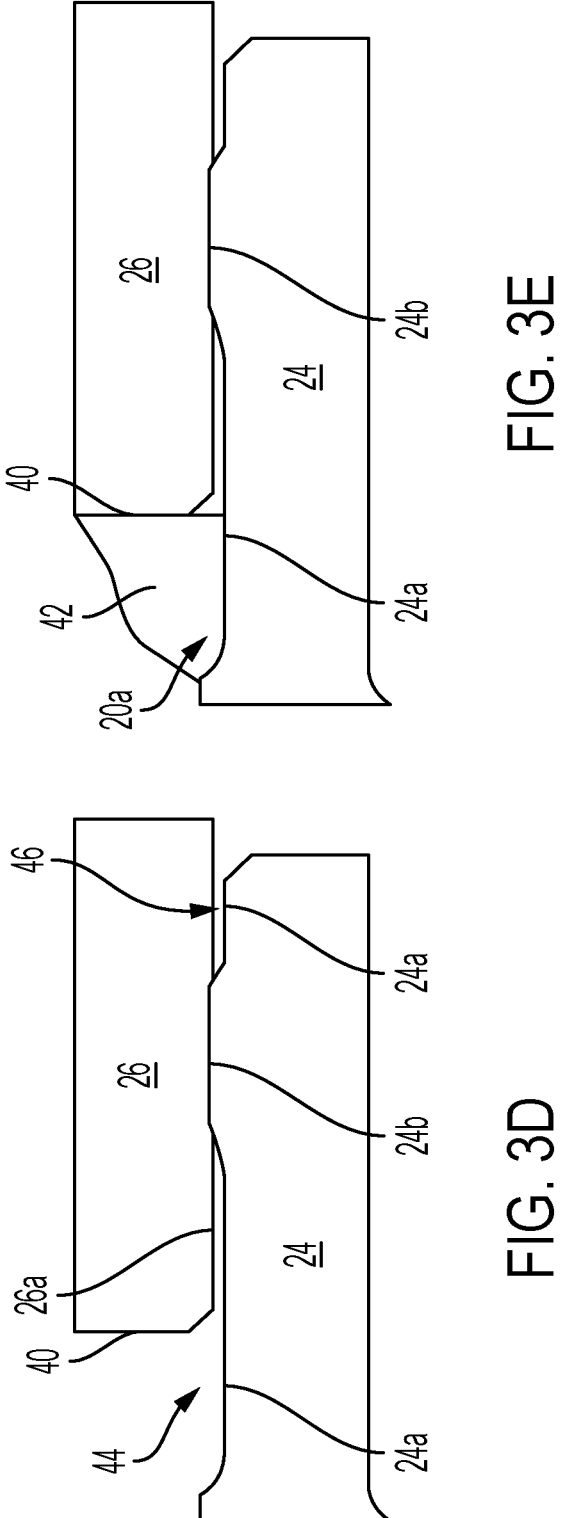

Next, as illustrated in FIGS. 3c and 3d, the first shell 20 and the second shell 22 can be axially pressed together such that a press fit connection is formed between the shells 20, 22 via radial overlap between the shells 20, 22. Specifically, the method includes joining the first tubular end section 24 to the second tubular end section 26 by pressing the protrusion 24b into engagement with the circumferential surface 26a of the second tubular end section 26 to form the press fit connection between the first shell 20 and the second shell 22.

As illustrated in FIG. 3c, prior to the joining, the protrusion 24b and the circumferential surface 26a of the second tubular end section 26 have a radial overlap X5 of 0.06 mm to 0.37 mm. The radial overlap is formed by an outer diameter of the protrusion 24b being greater than an inner diameter of the second tubular end section 26. This means, with first tubular end section 24 and second tubular end section 26 arranged coaxially, the circumferential surface 26a is the distance X5 inside of the outermost circumferential surface 50 of protrusion 24b.

As shown in FIG. 3c, the rim 40 of second tubular end section 26 includes a beveled inner corner 26c that intersects rim 40 and circumferential surface 26a of second tubular end section 26, and a rim 52 of first tubular end section 24 includes a beveled outer corner 24e that intersects rim 52 and base circumferential surface 24a of first tubular end section 24.

As first shell 20 and second shell 22 are pressed axially together, inner circumference 26b passes protrusion 24b and circumferential surface 26a is slid across outermost circumferential surface 50 of protrusion 24b until an entirety of outermost circumferential surface 50 is pressing radially outward against circumferential surface 26a to form the press fit connection.

As shown in FIG. 3d, rim 40 of second tubular end section 26 is radially aligned with and directly radially outside of ring-shaped surface section 44 of base circumferential surface 24a. A portion of circumferential surface 26a is radially aligned with and directly radially outside of ring-shaped surface section 46 of base circumferential surface 24a.

As illustrated in FIG. 3e, after to the joining, the method includes welding the rim 40 of the second tubular end section 26 to outer circumferential surface 20a of the first shell 20 to form the weld 42. In this example, the outer circumferential surface 20a that is welded is a portion of ring-shaped surface section 44 of base circumferential surface 24a.

The forming of the press fit connection between first shell 20 and second shell 22 can prevent the tilting between the first shell 20 and second shell 22 and result in a prior alignment of the components of torque converter 10. By forming the press fit connection using, the protrusion 24b can also act as a stop that prevents contamination of the parts of torque converter 10 inside of the housing 12.

The method can also include, prior to the joining, fixing the impeller blades 16 to the second shell 22.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE NUMERALS 10 torque converter
12 housing
14 turbine
14a outer radial extension
16 impeller blades
18 stator
20 first shell
20a outer circumferential surface
22 second shell
24 first tubular end section
24a base circumferential surface
24b protrusion
24c outer circumference
24d outer circumferential surface
24e beveled inner corner
26 second tubular end section
26a circumferential surface
26b inner circumference
26c beveled inner corner
28 turbine shell
30 turbine blades
32 damper assembly
34 hub
38 stator blades
40 rim
42 weld
44 two ring section surface sections
46 two ring section surface sections
48 ring
50 outermost circumferential surface
52 rim

What is claimed is:

1. A torque converter comprising:
a housing;
a turbine, impeller blades and a stator within the housing, the impeller blades being configured for directing fluid to the turbine, the stator being configured for redirect fluid from the turbine back to the impeller blades,
the housing including a first shell and a second shell joined together, the first shell or the second shell supporting the impeller blades,
the first shell including a first tubular end section and the second shell including a second tubular end section, the first tubular end section being received within the second tubular end section, the first tubular end section including a base circumferential surface and a protrusion protruding from the base circumferential surface, the protrusion engaging a circumferential surface of the second tubular end section to form a press fit connection between the first shell and the second shell,
wherein a rim of the second tubular end section is welded to an outer circumferential surface of the first shell by a weld,
wherein the protrusion is axially spaced from the weld by a gap defined in part by the base circumferential surface.

2. The torque converter as recited in claim 1 wherein the base circumferential surface and the protrusion are on an outer circumference of the first tubular end section and the circumferential surface of the second tubular end section is on an inner circumference of the second tubular end section.

3. The torque converter as recited in claim 1 wherein the protrusion is axially spaced from a rim of the first tubular end section by the base circumferential surface.

4. The torque converter as recited in claim 1 wherein the protrusion is a ring extending around a center axis of the torque converter.

5. The torque converter as recited in claim 1 wherein the press fit connection has an axial length of 1.5 to 2.2 mm.

6. The torque converter as recited in claim 1 wherein the base circumferential surface and the circumferential surface of the second tubular end section are radially spaced apart by 0.04 to 0.15 mm.

7. The torque converter as recited in claim 1 wherein the first tubular end section and the second tubular end section axially overlap each other by at least 8 mm.

8. The torque converter as recited in claim 1 wherein the first tubular end section and the second tubular end section axially overlap each other by between 8 mm and 12 mm.

9. The torque converter as recited in claim 1 wherein the protrusion protrudes from the base circumferential surface by between 0.10 and 0.52 mm.

10. A method of constructing the torque converter as recited in claim 1, the method comprising:
creating, on the first tubular end section, the base circumferential surface and the protrusion protruding from the base circumferential surface; and
joining the first tubular end section to the second tubular end section by pressing the protrusion into engagement with the circumferential surface of the second tubular end section to form the press fit connection between the first shell and the second shell.

11. The method as recited in claim 10 wherein the creating includes machining the first tubular end section to form the base circumferential surface and the protrusion.

12. The method as recited in claim 11 wherein the machining includes machining two rings into the first tubular end section to form the protrusion in between two separate ring-shaped portions of the base circumferential surface.

13. The method as recited in claim 10 wherein, prior to the joining, the protrusion and the circumferential surface of the second tubular end section have a radial overlap of 0.06 mm to 0.37 mm.

14. The method as recited in claim 13 wherein the radial overlap is formed by an outer diameter of the protrusion being greater than an inner diameter of the second tubular end section.

15. The method as recited in claim 10 further comprising, after the joining, welding a rim of the second tubular end section to an outer circumferential surface of the first shell.

16. The method as recited in claim 10 wherein the joining includes pressing the first tubular end section into the second tubular end section, the protrusion and base circumferential surface being on an outer circumference of the first tubular end section, the circumferential surface of the second tubular end section being on an inner circumference of the second shell.

17. The method as recited in claim 16 further comprising, prior to the joining, fixing the impeller blades to the second shell.

18. A torque converter comprising:
a housing;
a turbine, impeller blades and a stator within the housing, the impeller blades being configured for directing fluid to the turbine, the stator being configured for redirect fluid from the turbine back to the impeller blades, the housing including a first shell and a second shell joined together, the first shell or the second shell supporting the impeller blades, the first shell including a first tubular end section and the second shell including a second tubular end section, the first tubular end section being received within the second tubular end section, the first tubular end section including a base circumferential surface and a protrusion protruding from the base circumferential surface, the protrusion engaging a circumferential surface of the second tubular end section to form a press fit connection between the first shell and the second shell, wherein the base circumferential surface and the circumferential surface of the second tubular end section are radially spaced apart by 0.04 to 0.15 mm.

\* \* \* \* \*